United States Patent
Moor et al.

(10) Patent No.: US 9,694,440 B2
(45) Date of Patent: Jul. 4, 2017

(54) SUPPORT COLLAR GEOMETRY FOR LINEAR FRICTION WELDING

(75) Inventors: James J. Moor, New Hartford, CT (US); Herbert A. Chin, Portland, CT (US); Greg Czeladko, Avon, CT (US); Gene A. Danko, Manchester, CT (US); Andrew L. Haynes, Glastonbury, CT (US); Wangen Lin, S. Glastonbury, CT (US); Vincent Nevins, Chester, CT (US); Robert P. Schaefer, Vernon Rockville, CT (US); Eberhardt Privitzer, Los Lunas, NM (US)

(73) Assignee: United Technologies Corporation, Farmington, CT (US)

( * ) Notice: Subject to any disclaimer, the term of this patent is extended or adjusted under 35 U.S.C. 154(b) by 1172 days.

(21) Appl. No.: 12/909,928

(22) Filed: Oct. 22, 2010

(65) Prior Publication Data

US 2012/0099998 A1 Apr. 26, 2012

(51) Int. Cl.
*B23K 20/12* (2006.01)
*F01D 5/30* (2006.01)
*F01D 5/34* (2006.01)
*F01D 25/28* (2006.01)
*B23K 101/00* (2006.01)

(52) U.S. Cl.
CPC ........ *B23K 20/1205* (2013.01); *F01D 5/3061* (2013.01); *F01D 5/34* (2013.01); *F01D 25/285* (2013.01); *B23K 2201/001* (2013.01); *F05D 2230/239* (2013.01); *F05D 2230/80* (2013.01); *Y10T 29/49321* (2015.01)

(58) Field of Classification Search
USPC ................ 29/889.21, 402.01, 402.08, 889.1; 228/2.1, 112.1; 416/223 R, 213 R
See application file for complete search history.

(56) References Cited

U.S. PATENT DOCUMENTS

| | | | |
|---|---|---|---|
| 3,732,613 | A | 5/1973 | Steigerwald |
| 3,734,383 | A | 5/1973 | Ritter et al. |

(Continued)

FOREIGN PATENT DOCUMENTS

| | | |
|---|---|---|
| EP | 0624418 | 11/1994 |
| EP | 0624418 A2 | 11/1994 |

(Continued)

OTHER PUBLICATIONS

U.S. Appl. No. 12/639,215, filed Dec. 16, 2009, Consumable Collar for Linear Friction Welding of Blade Replacement for Damaged Integrally Bladed Rotors.

(Continued)

*Primary Examiner* — David Bryant
(74) *Attorney, Agent, or Firm* — Carlson, Gaskey & Olds, P.C.

(57) ABSTRACT

An example method of attaching an airfoil for an integrally bladed rotor includes placing a support collar in an installed position around at least a leading edge and trailing edge of an airfoil stub to be repaired in an integrally bladed rotor. The support collar and the airfoil stub together have a midline that is positioned between opposing, laterally outer surfaces of the airfoil stub when the support collar is in the installed position. The method performs linear friction welding to add a replacement airfoil to the airfoil stub.

20 Claims, 4 Drawing Sheets

(56) References Cited

U.S. PATENT DOCUMENTS

| | | | |
|---|---|---|---|
| 4,462,849 A | 7/1984 | MacLaughlin et al. | |
| 4,515,651 A | 5/1985 | MacLaughlin et al. | |
| 4,873,751 A | 10/1989 | Walker et al. | |
| 4,883,216 A | 11/1989 | Patsfall | |
| 4,934,583 A * | 6/1990 | Patsfall | 228/44.3 |
| 5,031,288 A | 7/1991 | Sadler | |
| 5,035,411 A | 7/1991 | Daines et al. | |
| 5,109,606 A | 5/1992 | DeMichael et al. | |
| 5,185,045 A | 2/1993 | Peters et al. | |
| 5,188,275 A | 2/1993 | Daines | |
| 5,197,190 A | 3/1993 | Coolidge | |
| 5,248,077 A | 9/1993 | Rhoades et al. | |
| 5,306,897 A | 4/1994 | Fraser | |
| 5,484,983 A | 1/1996 | Roell | |
| 5,489,194 A | 2/1996 | Yoshinari et al. | |
| 5,492,581 A | 2/1996 | Searle | |
| 5,518,562 A | 5/1996 | Searle et al. | |
| 5,551,623 A | 9/1996 | Collot et al. | |
| 5,609,471 A | 3/1997 | Frasier et al. | |
| 5,611,479 A | 3/1997 | Rosen | |
| 5,755,031 A * | 5/1998 | Baumgarten et al. | 29/889.1 |
| 5,813,593 A * | 9/1998 | Galaske, Jr. | 228/112.1 |
| 5,865,364 A | 2/1999 | Trask et al. | |
| 6,003,752 A | 12/1999 | Searle et al. | |
| 6,478,545 B2 * | 11/2002 | Crall et al. | 416/213 R |
| 6,536,110 B2 | 3/2003 | Smith et al. | |
| 6,598,489 B1 | 7/2003 | Van Cleve et al. | |
| 6,688,512 B2 | 2/2004 | Trask | |
| 6,787,740 B2 | 9/2004 | Smith et al. | |
| 8,006,380 B2 * | 8/2011 | Rawson et al. | 29/889.1 |
| 2002/0127108 A1 | 9/2002 | Crall et al. | |
| 2005/0274010 A1 * | 12/2005 | Rawson et al. | 29/889.1 |
| 2008/0235946 A1 | 10/2008 | Ide et al. | |
| 2009/0249622 A1 | 10/2009 | Schreiber | |
| 2011/0005075 A1 * | 1/2011 | Trewiler et al. | 29/889.1 |
| 2011/0219616 A1 * | 9/2011 | Bayer et al. | 29/889.1 |
| 2012/0148413 A1 * | 6/2012 | Richter et al. | 416/223 R |

FOREIGN PATENT DOCUMENTS

| | | |
|---|---|---|
| EP | 0669183 A1 | 2/1995 |
| EP | 0669183 | 8/1995 |
| EP | 1604770 | 12/2005 |
| GB | 2277896 | 11/1994 |

OTHER PUBLICATIONS

U.S. Appl. No. 12/727,472, filed May 19, 2010, Repair of Integrally Bladed Rotors.

Singapore Search Report for Singapore Patent Application No. 201107279-0 dated Sep. 27, 2012.

* cited by examiner

US 9,694,440 B2

SUPPORT COLLAR GEOMETRY FOR LINEAR FRICTION WELDING

This invention was made with government support under Contract No. F33657-03-D-0016-0010 awarded by the United States Air Force. The Government has certain rights in this invention.

BACKGROUND

This disclosure relates generally to turbomachine airfoils and, more particularly, to repairing or replacing airfoils using linear friction welding techniques.

As known, gas turbine engines, and other turbomachines, include multiple sections, such as a fan section, a compressor section, a combustor section, a turbine section, and an exhaust section. The compressor section and the turbine section include airfoil arrays mounted for rotation about an engine axis. The airfoil arrays include multiple individual airfoils (i.e., blades) that extend radially from a mounting platform to an airfoil tip. The blade arrays and mounting platform may form a one piece, integrally bladed rotor or bladed disk/blisk.

Air moves into the engine through the fan section. Rotating the airfoil arrays in the compressor section compresses the air. The compressed air is then mixed with fuel and combusted in the combustor section. The products of combustion are expanded to rotatably drive airfoil arrays in the turbine section. Rotating the airfoil arrays in the turbine section drives rotation of the fan and compressor sections. Airfoils in the gas turbine engine may become damaged. Replacing the damaged airfoils in a conventionally bladed rotor is relatively simple. Replacing the damaged airfoils in an integrally bladed rotor is often significantly more difficult (sometimes not feasible) and expensive.

SUMMARY

An example method of attaching an airfoil for an integrally bladed rotor includes placing a support collar in an installed position around at least a leading edge and trailing edge of an airfoil stub to be repaired in an integrally bladed rotor. The support collar and the airfoil stub together have a midline that is positioned between opposing, laterally outer surfaces of the airfoil stub when the support collar is in the installed position. The method performs linear friction welding to add an airfoil to the airfoil stub.

Another example method of attaching an airfoil for an integrally bladed rotor includes placing a support collar in an installed position around at least a leading edge and a trailing edge of an airfoil stub to be repaired in an integrally bladed rotor. The support collar and the airfoil stub together have a midline that does not extend laterally past a laterally outer surface of the blade stub. The method includes performing linear friction welding to add an airfoil to the airfoil stub.

An example integrally bladed rotor includes a rotor hub and a plurality of blades extending radially outwardly of the rotor hub. At least one of the blades is attached by a linear friction welding operation. The blade includes an airfoil stub portion that was associated with the rotor hub prior to the attachment and an airfoil portion that has been linear friction welded to the airfoil stub as part of the attachment. A collar supported the airfoil stub during the linear friction welding and is then machined away. The collar includes a consumable portion that is consumed during the linear friction welding. The consumable portion and the blade stub have a midline that is bounded by opposing laterally outer surfaces of the blade stub during the linear friction welding.

These and other features of the disclosed examples can be best understood from the following specification and drawings, the following of which is a brief description.

DETAILED DESCRIPTION

Figure 1:
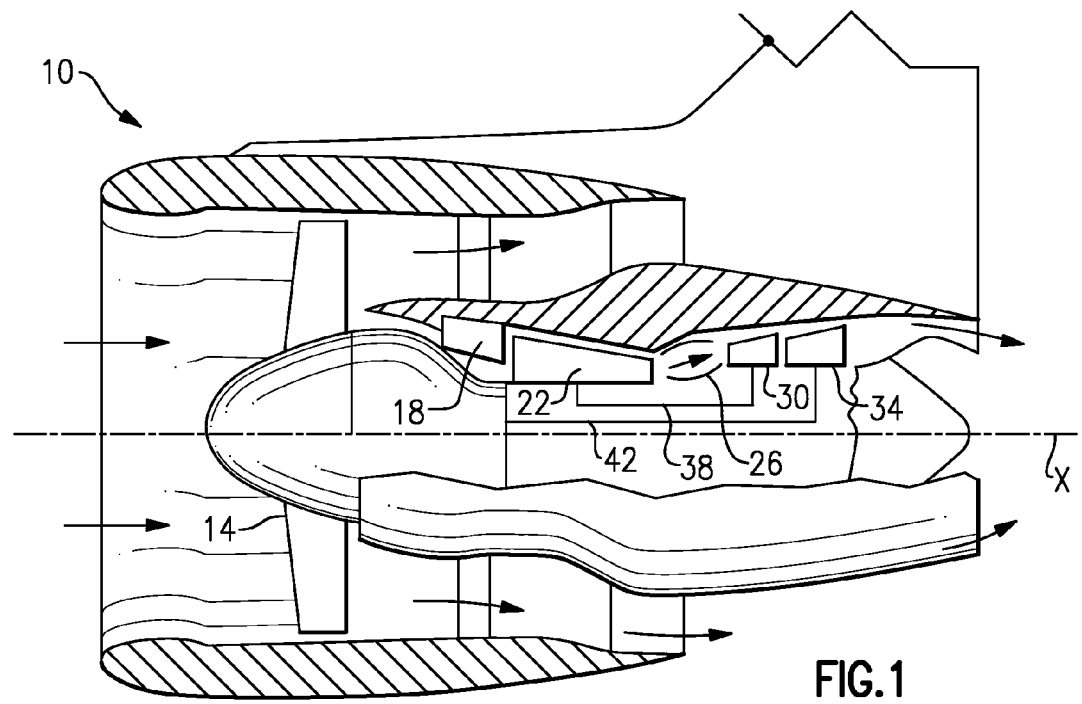
FIG. 1 shows a schematic view of an example gas turbine engine.
Figure 2:
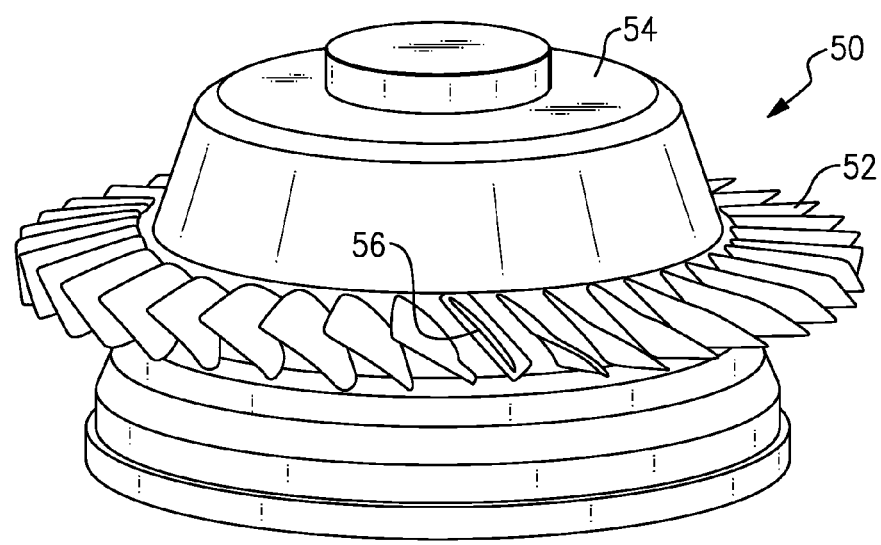
FIG. 2 shows an integrally bladed rotor in a repair tooling fixture from the FIG. 1 engine.
Figure 3:
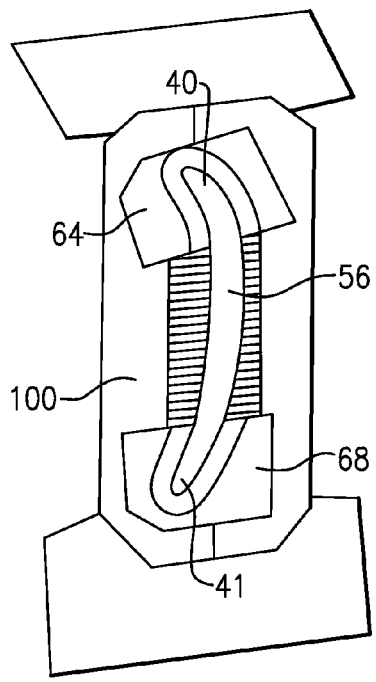
FIG. 3 schematically shows a top view of an airfoil stub ready for a linear friction welding operation.
Figure 4:
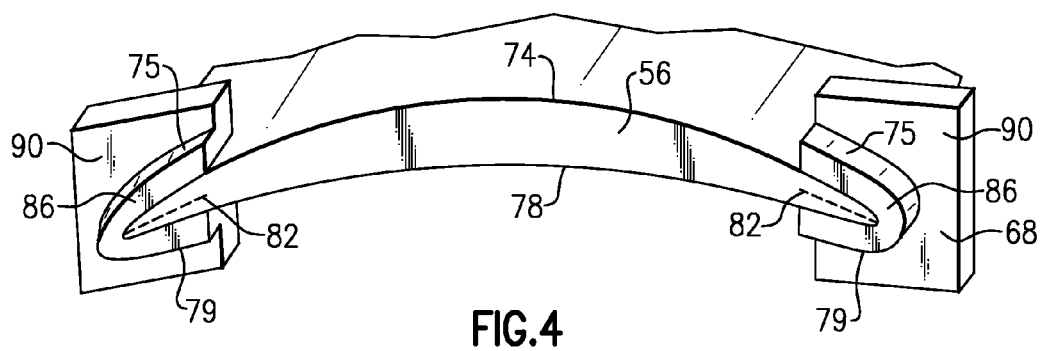
FIG. 4 shows a perspective view of the FIG. 3 airfoil stub.

FIG. 1 schematically illustrates an example gas turbine engine 10 including (in serial flow communication) a fan 14, a low pressure compressor 18, a high pressure compressor 22, a combustor 26, a high pressure turbine 30, and a low pressure turbine 34. The gas turbine engine 10 is circumferentially disposed about an engine axis X. The gas turbine engine is an example turbomachine.

During operation, air is pulled into the gas turbine engine 10 by the fan 14, pressurized by the compressors 18 and 22, mixed with fuel, and burned in the combustor 26. The turbines 30 and 34 extract energy from the hot combustion gases flowing from the combustor 26. In a two-spool design, the high pressure turbine 30 utilizes the extracted energy from the hot combustion gases to power the high pressure compressor 22 through a high speed shaft 38. The low pressure turbine 34 utilizes the extracted energy from the hot combustion gases to power the low pressure compressor 18 and the fan 14 through a low speed shaft 42.

The examples described in this disclosure are not limited to the two-spool engine architecture described and may be used in other architectures, such as a single spool axial design, a three-spool axial design, and still other architectures. That is, there are various types of engines, and other turbomachines, that can benefit from the examples disclosed herein.

Referring to FIGS. 2-5 with continuing reference to FIG. 1, an example integrally bladed rotor 50 includes a plurality of airfoils 52 extending radially away from a rotor hub. The example integrally bladed rotor 50 includes a damaged airfoil stub 56. During operation, the integrally bladed rotor 50 typically forms part of the low pressure compressor 18 and/or high pressure compressor 22 of the gas turbine engine 10. The integrally bladed rotor 50 is made of a titanium alloy, in this example, but may be made of nickel alloy or other materials.

The damaged airfoil stub 56 is to be repaired. During repair, the integrally bladed rotor 50 is mounted within a linear friction welding machine incorporating a fixture 54. The airfoil stub 56 is supported by a collar assembly 100. In this example, the collar 100 includes a sub-collar 64 associated with a leading edge 40 of the airfoil stub 56 and a sub-collar 68 associated with a trailing edge 41 of the airfoil stub 56. The sub-collars 64 and 68 each include a base portion 90 and a consumable portion 86. The consumable portion 86 is consumed during the linear friction welding. Although the example describes replacing a damaged airfoil stub, another example may include attaching an airfoil during initial assembly of the rotor 50.

The example airfoil stub 56 includes a convex (or suction) side 74 and a concave (or pressure) side 78. The consumable portion 86 is defined by a surface 75 that is typically aligned with the convex side 74, and a surface 79 that is typically aligned with the concave side 78. The consumable portion 86 of the sub-collar 68 thus has a lateral profile that matches the geometry of an airfoil stub 56.

A midline 82 of the consumable portion 86 and the portion of the airfoil stub 56 within the sub-collar 68 is centered between the surface 75 and the surface 79. That is, at a given chord position X, the distance $D_1$ between the surface of the surface 75 and the midline 82 is the same as the distance $D_2$ between the surface of the concave side surface 79 and the midline 82. In this example, the midline 82 is positioned between (or bounded by) the surface 74 and the surface 78.

During the linear friction welding process, the consumable portion 86 is consumed while the base portion 90 remains. A person having skill in the art of linear friction welding, and the benefit of this disclosure, would understand how material is consumed during the linear friction welding.

The sub-collars 64 and 68 are the same material as the airfoil stub 56 and the replacement airfoil 94 in this example. In another example, one or both of the sub-collars 64 and 68 is a different material than the airfoil stub 56, the replacement airfoil 94, or both.

Figure 5:
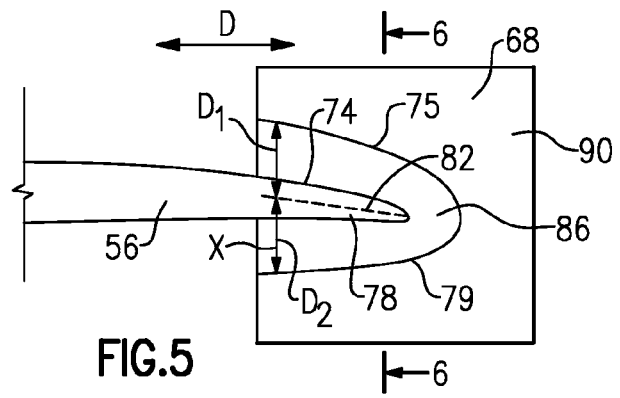
FIG. 5 shows a close up view of a trailing edge of an airfoil stub in the FIG. 3 linear friction welding operation.
Figure 6:
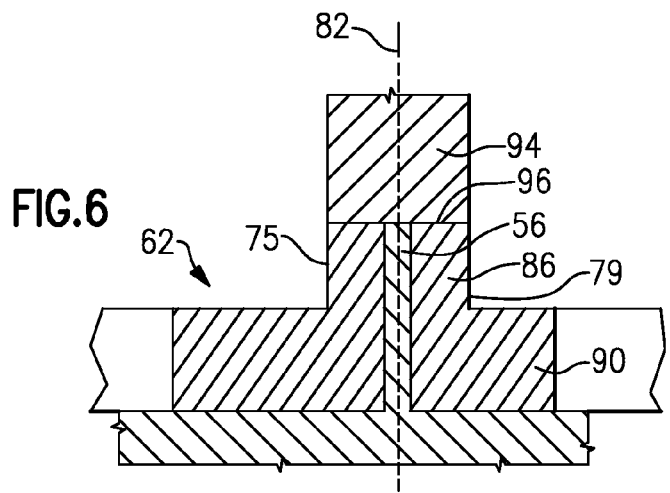
FIG. 6 shows a section view at line 6 of FIG. 5 with an airfoil.
Figure 7:
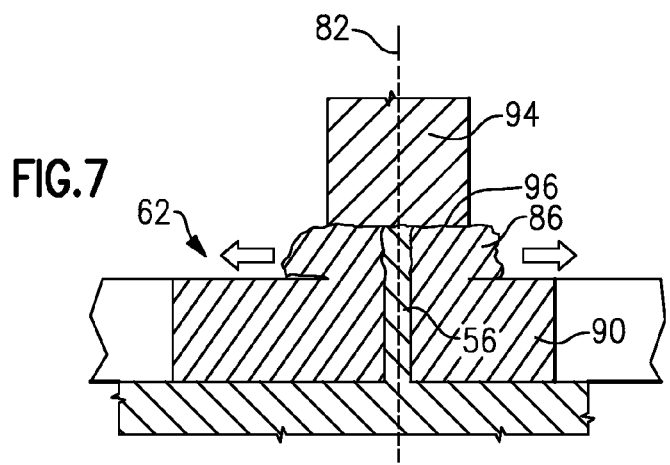
FIG. 7 shows the FIG. 6 section view after partially linear friction welding the airfoil to an airfoil stub.
Figure 8:
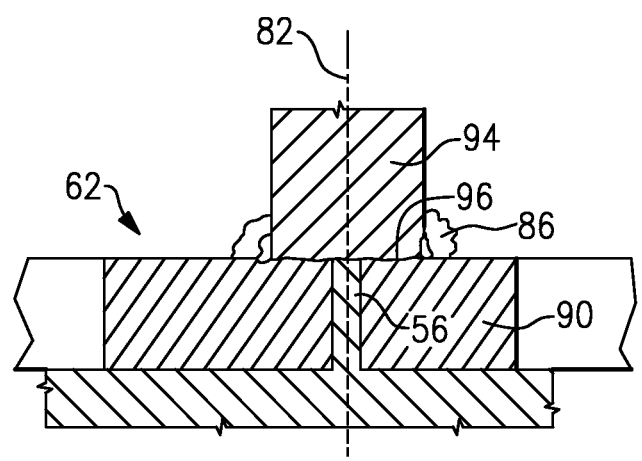
FIG. 8 shows the FIG. 6 section view after linear friction welding the airfoil to an airfoil stub.
Figure 9:
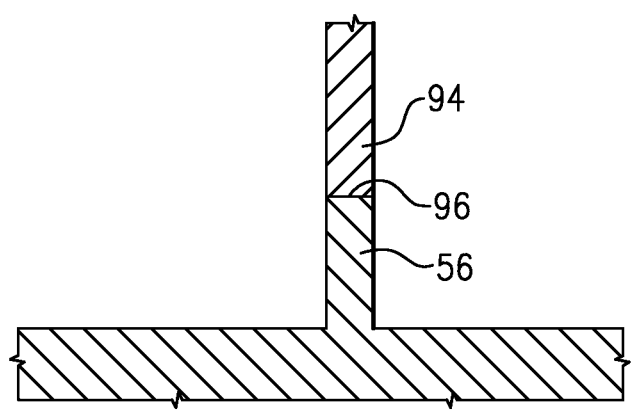
FIG. 9 shows the FIG. 6 section view after machining away excess material.

Referring now to FIGS. 6-9 with continuing reference to FIG. 5, a replacement airfoil 94 is positioned against the airfoil stub 56 and the consumable portion 86 of the sub-collar 64 at an interface 96. During the linear welding process, the replacement airfoil 94 oscillates back and forth in a weld direction D that is generally parallel to a chord of the airfoil stub 56.

By moving the replacement airfoil 94 and the airfoil stub 56 rapidly relative to each other, heat is built up, and will weld the two together. The linear friction welding technique is known.

In this example, the consumable portion 86 and a portion of the airfoil stub 56 are consumed during the linear friction welding. Again, the consumable portion 86 is sized such that the midline 82 is positioned between the surface 74 and the surface 78. This arrangement causes material in the consumable portion 86 to flow away from, rather than toward, the airfoil stub 56 as the material in the consumable portion 86 is consumed. As can be appreciated, the midline is radially extending relative to the engine axis X, in this example.

In this example, the midline 82 represents the circumferential center of the section of the consumable portion 86 and the blade stub 56. That is, the midline is centered between the surface 74 and the surface 78, and the distance $D_1$ is about the same as the distance $D_2$. The consumable portion 86 includes substantially the same amount of material (within 5%, for example) on either side of the midline.

In other examples, the midline 82 is not centered between the surface 74 and the surface 78. However, in such examples, the midline still does not extend laterally past the surface 74 or the surface 78. Thus, it is possible that the distance $D_1$ is not the same as the distance $D_2$ After securing the airfoil 94 to the airfoil stub 56 and the consumable portion 86, the consumable portion 86 is machined away along with a portion of the replacement airfoil 94 and some of the airfoil stub 56.

Features of the disclosed examples include laterally balancing the amount of consumable material during a linear friction weld to avoid polluting desired welds with the material that would otherwise be expelled from the resultant linear friction weld joint. In the prior art, the consumable portion may contain more material on the concave side than on the convex side, or vice versa. Significantly more material on one of the sides could cause material intended for expulsion from the consumable portion to flow back toward the airfoil stub during the linear friction welding, which can pollute or otherwise foul the weld bond.

The surface of the consumable portion of the collar in contact with the airfoil matches with the profile of the airfoil to provide intimate structural support during welding. The size of the airfoil is used to determine the size of the convex side of the collar and the size of the concave side of the collar resulting the flow of material away from the airfoil during the linear friction welding.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A method of attaching an airfoil for an integrally bladed rotor comprising:
   sizing a consumable portion of a support collar assembly such that the consumable portion has a midline that is positioned between opposing, laterally outer surfaces of an airfoil stub for an integrally bladed rotor when the support collar assembly is in an installed position, the support collar assembly placed around at least a leading edge and a trailing edge of the airfoil stub when in the installed position; and
   performing linear friction welding to add an airfoil to the airfoil stub.

2. The method of claim 1, wherein the midline corresponds generally to the circumferential center of a section of the consumable portion, the section taken along a plane that is perpendicular to the first direction.

3. The method of claim 1, wherein a convex side of the consumable portion is circumferentially spaced from the midline a first distance, and a concave side of the consumable portion is circumferentially spaced from the midline a second distance that is the same as the first distance.

4. The method of claim 3, wherein a convex side of the consumable portion contains more material or less material than a concave side of the consumable portion.

5. The method of claim 3, wherein a convex side of the consumable portion contains less material or less material than a concave side of the consumable portion.

6. The method of claim 1, including consuming the consumable portion of the support collar assembly during the linear friction welding.

7. The method of claim 1, wherein the support collar assembly and the airfoil stub are formed of the same material.

8. The method of claim 7, wherein the same material is a titanium material.

9. The method of claim 1, wherein the support collar assembly is formed of a first sub-collar configured to support the leading edge of the airfoil stub and a second sub-collar configured to support the trailing edge of the airfoil stub, and with unsupported positions between the first sub-collar and the second sub-collar.

10. The method of claim 1, including consuming a first amount of material from a first lateral side of the midline during the linear friction welding; and
consuming a second amount of material from an opposing, second side of the midline during the linear friction welding, the first amount of material substantially the same as the second amount of material.

11. The method of claim 1, wherein the integrally bladed rotor comprises a titanium alloy.

12. The method of claim 1, wherein the support collar assembly comprises a titanium alloy.

13. The method of claim 1, wherein a convex side of the consumable portion contains more material or less material than a concave side of the consumable portion.

14. The method of claim 1, wherein the support collar assembly includes a first sub-collar for positioning about the leading edge and a second sub-collar for positioning about the trailing edge.

15. A method of attaching an airfoil for an integrally bladed rotor comprising:
sizing a consumable portion of a support collar assembly such that the consumable portion has a midline that is positioned between opposing, laterally outer surfaces of an airfoil stub when the support collar assembly is in an installed position around at least a leading edge and trailing edge of the airfoil stub for an integrally bladed rotor;
after the sizing, placing the support collar assembly in the installed position; and
performing linear friction welding to add an airfoil to the airfoil stub.

16. The method of claim 15, including consuming a first amount of material from a first lateral side of the midline during the linear friction welding; and
consuming a second amount of material from an opposing, second side of the support collar assembly during the linear friction welding, the first amount of material substantially the same as the second amount of material.

17. The method of claim 15, wherein a convex side of the consumable portion is circumferentially spaced from the midline a first distance, and a concave side of the consumable portion is circumferentially spaced from the midline a second distance that is the same as the first distance.

18. The method of claim 17, wherein a convex side of the consumable portion contains more material than a concave side of the consumable portion.

19. The method of claim 17, wherein a concave side of the consumable portion contains more material than a convex side of the consumable portion.

20. The method of claim 15, wherein the support collar assembly includes a first sub-collar for positioning about the leading edge and a second sub-collar for positioning about the trailing edge.

\* \* \* \* \*

UNITED STATES PATENT AND TRADEMARK OFFICE
CERTIFICATE OF CORRECTION

PATENT NO. : 9,694,440 B2
APPLICATION NO. : 12/909928
DATED : July 4, 2017
INVENTOR(S) : James J. Moor et al.

It is certified that error appears in the above-identified patent and that said Letters Patent is hereby corrected as shown below:

In the Claims

In Claim 5, Column 4, Line 56; after "consumable portion contains" delete "less material or"

Signed and Sealed this
Twentieth Day of November, 2018

Andrei Iancu
*Director of the United States Patent and Trademark Office*